(12) United States Patent
McCloud et al.

(10) Patent No.: US 11,807,309 B2
(45) Date of Patent: Nov. 7, 2023

(54) COMPOSITE STRUCTURES WITH EMBEDDED VEILS FOR ANCHORING FASTENERS

(71) Applicant: Wabash National, L.P., Lafayette, IN (US)

(72) Inventors: Travis Smith McCloud, Malabar, FL (US); Scott M. Lewit, Indialantic, FL (US)

(73) Assignee: Wabash National, L.P., Lafayette, IN (US)

( * ) Notice: Subject to any disclaimer, the term of this patent is extended or adjusted under 35 U.S.C. 154(b) by 269 days.

(21) Appl. No.: 17/124,610

(22) Filed: Dec. 17, 2020

(65) Prior Publication Data
US 2021/0188365 A1    Jun. 24, 2021

Related U.S. Application Data

(60) Provisional application No. 62/951,041, filed on Dec. 20, 2019.

(51) Int. Cl.

| | |
|---|---|
| B32B 5/06 | (2006.01) |
| B62D 29/04 | (2006.01) |
| B62D 33/00 | (2006.01) |
| B32B 5/24 | (2006.01) |
| B32B 5/26 | (2006.01) |
| B32B 5/02 | (2006.01) |
| B29C 41/20 | (2006.01) |
| B29C 41/22 | (2006.01) |
| B29L 31/30 | (2006.01) |

(52) U.S. Cl.
CPC ............ *B62D 29/043* (2013.01); *B29C 41/20* (2013.01); *B29C 41/22* (2013.01); *B32B 5/022* (2013.01); *B32B 5/06* (2013.01); *B32B 5/245* (2013.01); *B32B 5/26* (2013.01); *B62D 33/00* (2013.01); *B29L 2031/30* (2013.01); *B32B 2605/00* (2013.01)

(58) Field of Classification Search
None
See application file for complete search history.

(56) References Cited

U.S. PATENT DOCUMENTS

| | | |
|---|---|---|
| 10,919,579 B2 | 2/2021 | McCloud et al. |
| 11,338,862 B2 | 5/2022 | McCloud et al. |
| 11,400,987 B2 | 8/2022 | McCloud et al. |
| 2022/0161871 A1 | 5/2022 | Storz et al. |
| 2022/0289307 A1 | 9/2022 | McCloud et al. |
| 2023/0173972 A1 | 6/2023 | Wylezinski |

FOREIGN PATENT DOCUMENTS

DE        10109709 A1 *  8/2002  ........... B62D 29/045

* cited by examiner

*Primary Examiner* — Alexander S Thomas
(74) *Attorney, Agent, or Firm* — Faegre Drinker Biddle & Reath LLP

(57) ABSTRACT

A composite structure of a cargo body and a method of making the same are disclosed. The composite structure includes at least one anchor embedded between fiber-reinforced polymer (FRP) layers. The embedded anchor includes a porous veil of nonwoven fibers in a polymer-rich matrix. Accessories may be coupled to the composite structure by anchoring mechanical fasteners into the embedded anchor.

22 Claims, 4 Drawing Sheets

COMPOSITE STRUCTURES WITH EMBEDDED VEILS FOR ANCHORING FASTENERS

CROSS REFERENCE TO RELATED APPLICATION

This application claims priority to U.S. Provisional Patent Application Ser. No. 62/951,041, filed Dec. 20, 2019, the disclosure of which is hereby expressly incorporated by reference herein in its entirety.

FIELD OF THE DISCLOSURE

The present disclosure relates generally to composite structures and methods of making the same. More particularly, the present disclosure relates to composite structures for use in cargo vehicles and other applications having embedded anchors and methods of making the same.

BACKGROUND OF THE DISCLOSURE

Cargo vehicles are used in the transportation industry for transporting many different types of cargo. Certain cargo vehicles may be refrigerated and insulated to transport temperature-sensitive cargo. Cargo vehicles may be constructed using composite materials, which may lead to an absence of or reduction in metallic and wood materials and associated advantages, including simplified construction, thermal efficiency, reduced water intrusion and corrosion, and improved fuel efficiency through weight reduction, for example. However, such cargo materials must be sufficiently strong and durable to withstand the demands of normal use, both exteriorly (e.g., weather, road conditions, other vehicles) and interiorly (e.g., cargo, forklifts).

SUMMARY OF THE DISCLOSURE

A composite structure of a cargo body and a method of making the same are disclosed. The composite structure includes at least one anchor embedded between fiber-reinforced polymer (FRP) layers. The embedded anchor includes a porous veil of nonwoven fibers in a polymer-rich matrix. Accessories may be coupled to the composite structure by anchoring mechanical fasteners into the embedded anchor.

According to an exemplary embodiment of the present disclosure, a laminated composite structure of a cargo body is provided, the composite structure including a core layer including an inner foam core surrounded by a first fiber-reinforced polymer, an outer skin layer coupled to the core layer and including a second fiber-reinforced polymer, an inner skin layer coupled to the core layer and including a third fiber-reinforced polymer, and at least one anchor embedded between the first fiber-reinforced polymer and an adjacent one of the second and third fiber-reinforced polymers, wherein the at least one anchor includes a porous veil of nonwoven fibers.

According to another exemplary embodiment of the present disclosure, a laminated composite structure of a cargo body is provided, the composite structure including a core layer, an outer skin layer coupled to the core layer, an inner skin layer coupled to the core layer, an accessory coupled to the outer or inner skin layer with a mechanical fastener, and at least one anchor embedded between the core layer and the outer or inner skin layer and receiving the mechanical fastener.

According to yet another exemplary embodiment of the present disclosure, a method of manufacturing a composite structure of a cargo body is provided, the method including the steps of applying a gel-coat resin onto a mold surface to form a first gel coat, applying a first reinforcing fiber layer onto the first gel coat, arranging a core layer including a plurality of preforms on the first reinforcing fiber layer, applying at least one porous veil of nonwoven fibers adjacent to the preforms, applying a second reinforcing fiber layer onto the preforms, applying a laminating resin to wet-out the first reinforcing fiber layer, the second reinforcing fiber layer, and the veil, and curing the gel-coat and laminating resins.

Additional features and advantages of the present invention will become apparent to those skilled in the art upon consideration of the following detailed description of the illustrative embodiments exemplifying the best mode of carrying out the invention as presently perceived.

BRIEF DESCRIPTION OF THE DRAWINGS

The foregoing aspects and many of the intended advantages of this invention will become more readily appreciated as the same becomes better understood by reference to the following detailed description when taken in conjunction with the accompanying drawings.

Figure 1:
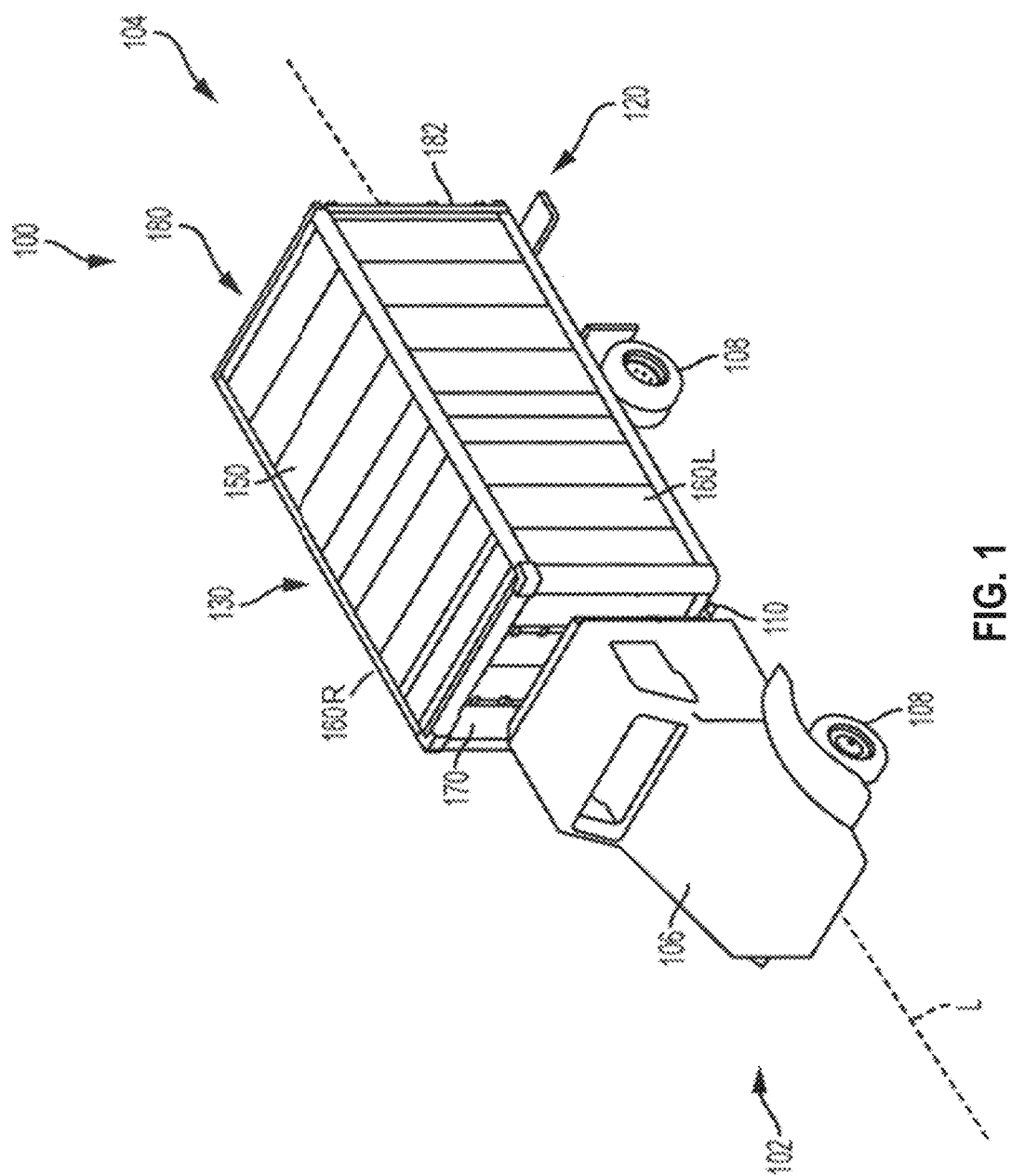
FIG. 1 is a perspective view of a cargo vehicle having a cargo body with having a floor, a roof, right and left sidewalls, and a front wall.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates an embodiment of the invention, and such an exemplification is not to be construed as limiting the scope of the invention in any manner.

DETAILED DESCRIPTION OF THE DRAWINGS

For the purposes of promoting an understanding of the principals of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrative devices and described methods and further applications of the principles of the invention which would normally occur to one skilled in the art to which the invention relates.

1. Cargo Vehicle

Referring initially to FIG. 1, a cargo vehicle 100 is shown for supporting and transporting cargo. The illustrative straight frame vehicle 100 extends along a longitudinal axis L from a front end 102 to a rear end 104 and includes a motorized truck 106 that powers a plurality of wheels 108 or other traction devices, a chassis 110, and a bumper assembly 120. The illustrative vehicle 100 further includes a cargo body 130 having a floor 140 (FIG. 2) for supporting cargo, a roof 150, right and left sidewalls 1 60R, 1 60L, a front wall or nose 170, and a rear door assembly 180 having a rear frame 182 and a door (not shown) to access the cargo body 130.

In the illustrated embodiment of FIG. 1, cargo body 130 is an enclosed body that is supported atop chassis 110. Cargo body 130 may be refrigerated and/or insulated to transport temperature-sensitive cargo. While the concepts of this disclosure are described in relation to a refrigerated truck body, it will be understood that they are equally applicable to other vehicles generally, and more specifically to conventional trailers (e.g., dry freight trailers, flatbed trailers, commercial trailers, small personal trailers) and/or box or van semi-trailers, and the like. Accordingly, those skilled in the art will appreciate that the present invention may be implemented in a number of different applications and embodiments and is not specifically limited in its application to the particular embodiments depicted herein.

2. Composite Sidewalls and Other Composite Structures

Cargo body 130 may be constructed, at least in part, of composite materials. For example, the floor 140, roof 150, right and left sidewalls 160R, 160L, and/or front wall 170 of the composite cargo body 130 may be constructed of composite materials. As such, the floor 140, roof 150, right and left sidewalls 160R, 160L, and/or front wall 170 of the composite cargo body 130 may be referred to herein as composite structures. Each composite structure may be a single, unitary component, which may be formed from a plurality of layers permanently coupled together. Exemplary composite materials for use in the composite cargo body 130 include fiber-reinforced polymers or plastics (FRPs), for example glass-fiber-reinforced polymers or plastics (GFRPs) and carbon-fiber-reinforced polymers or plastics (CRPs).

Figure 2:
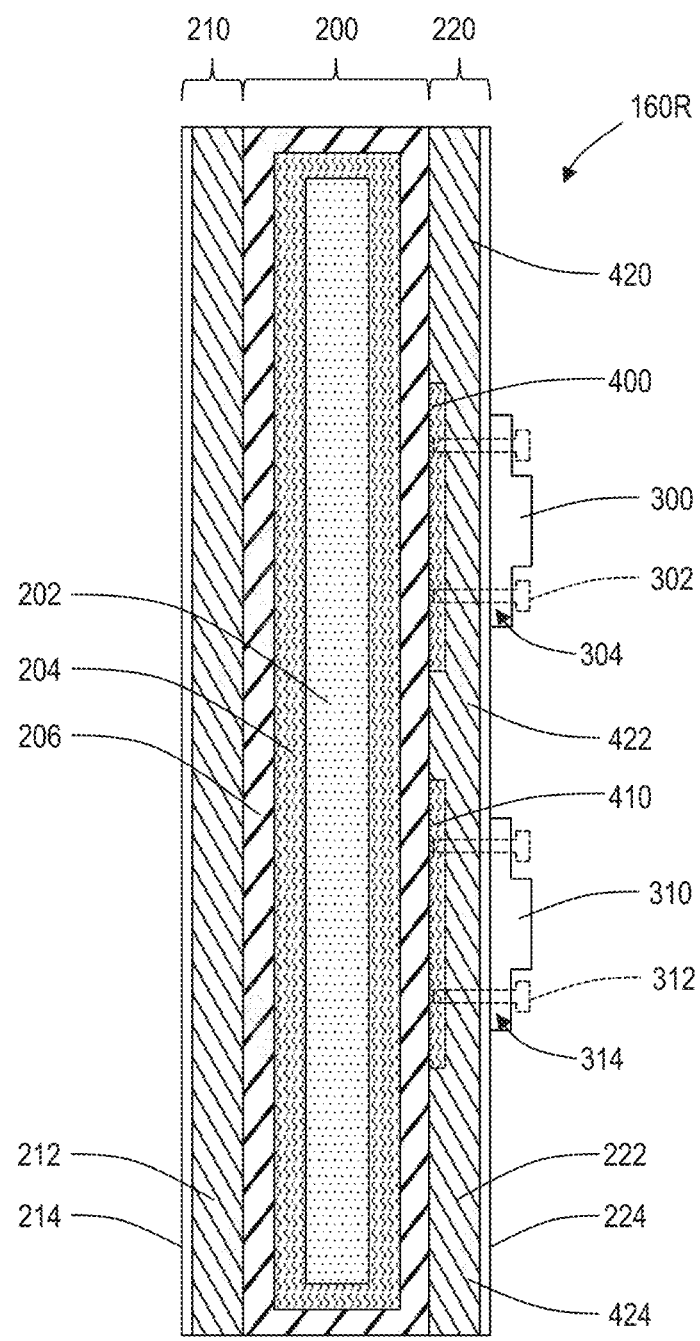
FIG. 2 is a cross-sectional view of the right sidewall of FIG. 1, which is a composite structure with embedded anchors.

A laminated composite right sidewall 1 60R is shown in cross-section in FIG. 2. Those skilled in the art will appreciate that the following teachings related to the right sidewall 160R may also be applied to the floor 140, roof 150, left sidewall 160L, and/or front wall 170 of the composite cargo body 130.

The illustrative sidewall 160R of FIG. 2 includes a core layer 200, an outer skin layer 210 that faces outwardly from the cargo body 130 (FIG. 1) toward the surrounding environment, and an inner skin layer 220 that faces inwardly toward the cargo in cargo body 130 (FIG. 1). Each of these laminated layers 200, 210, 220 is described further below.

Referring still to FIG. 2, the core layer 200 of the composite sidewall 160R may include one or more structural supports or preforms. Exemplary preforms for use in core layer 200 include PRISMA® preforms provided by Compsys, Inc. of Melbourne, Fla. Each preform may include an inner foam core 202, an intermediate layer 204, and an outer FRP layer 206, each of which is described further below.

The inner foam core 202 of each preform may include a self-expanding, self-curing structural foam material. Suitable foams include polyurethane foams, such as a methylene-diphenyl-methane diisocyanate (MDI) based rigid polyurethane foam, for example.

The outer FRP layer 206 (which may be referred to herein as the "first" FRP layer 206) of each preform may include a polymer matrix reinforced with fibers configured to enhance the structural properties of the surrounding polymer matrix. Suitable reinforcing fibers include glass fibers, carbon fibers, aramid fibers (e.g., Kevlar® fibers available from DuPont Protection Technologies of Richmond, Va.), linear polyethylene or polypropylene fibers (e.g., Spectra® fibers available from Honeywell International Inc. of Morris Plains, N.J.), or polyester fibers. The reinforcing fibers may be present in fabric form, which may be mat, woven, or knit, for example. Exemplary fabrics include chopped fiber fabrics, such as chopped strand mats (CSM), and continuous fiber fabrics, such as 0°/90° fiberglass fabrics, +45°/−45° fiberglass fabrics, +60°/−60° fiberglass fabrics, 0° warp unidirectional fiberglass fabrics, and other stitched fiber fabrics, for example. Exemplary fabrics are commercially available from Vectorply Corporation of Phenix City, Ala. and include the E-LM 1810 fiberglass fabric with 0° unidirectional fibers, the E-LTM 3610 fiberglass fabric with 0°/90° fibers, and the EL TM 2408 fiberglass fabric with 0°/90° fibers, for example. Such fabrics may have an area density of about 800 g/m² to about 1,500 g/m² or more.

The intermediate layer 204 of each preform may serve as a transition layer for coupling the inner foam core 202 to the outer FRP layer 206. The intermediate layer 204 may be sufficiently porous to at least partially receive foam from the adjacent foam core 202 and the polymer matrix from the adjacent FRP layer 206. The intermediate layer 204 may also be mechanically coupled (e.g., stitched) to the adjacent FRP layer 206 to simplify manufacturing, to ensure proper placement, and to prevent shifting and/or bunching. The intermediate layer 204 may be a nonwoven fabric with continuous or chopped fibers, which may be the same as or similar to the fabric described in Section 5 below.

The individual preforms of the core layer 200 may be designed to accommodate the needs of the particular application. For example, in areas of the final structure requiring more strength and/or insulation, a low-density foam core 202 may be replaced with a high-density foam core 202 or a hard, plastic block. The individual preforms of the core layer 200 may also be sized, shaped, and arranged in a manner that accommodates the needs of the particular application. For example, in areas of the final structure requiring less strength, the preforms may be relatively large in size, with the foam cores 202 spanning relatively large distances before reaching the surrounding layers 204,206. By contrast, in areas of the final structure requiring more strength, the preforms may be relatively small in size, with the foam cores 202 spanning relatively small distances before reaching the surrounding layers 204, 206. Stated differently, the preforms may be shaped as relatively wide panels in areas of the final structure requiring less strength and as relatively narrow support beams in areas of the final structure requiring more strength.

Referring still to FIG. 2, the outer skin layer 210 of the composite sidewall 1 60R may include a FRP layer 212 and an outer gel coat 214. The FRP layer 212 (which may be referred to herein as the "second" FRP layer 212) may be similar to the above-described first FRP layer 206, including a polymer matrix reinforced with suitable reinforcing fibers. According to an exemplary embodiment of the present disclosure, a plurality of different reinforcing fiber layers may be stacked together and used in combination to form the FRP layer 212. For example, a chopped fiber fabric (e.g., CSM) may be positioned adjacent to a continuous fiber fabric. In this stacked arrangement, the chopped fibers may help support and maintain the adjacent continuous fibers in place, especially around corners or other transitions. Also, the chopped fibers may serve as a web to resist column-type loads in compression, while the adjacent continuous fibers may resist flange-type loads in compression. Adjacent reinforcing fiber layers may be stitched or otherwise coupled together to simplify manufacturing, to ensure proper placement, and to prevent shifting and/or bunching. The outer gel coat 214 may be a polymer-rich or polymer-only layer that provides a smooth outer finish in a desired color.

Referring still to FIG. 2, the inner skin layer 220 of the composite sidewall 1 60R may include a FRP layer 222 and an optional inner gel coat 224. The FRP layer 222 (which may be referred to herein as the "third" FRP layer 222) may be similar to the above-described first and second FRP layers 206, 212, including a polymer matrix reinforced with suitable reinforcing fibers. The inner gel coat 224 may be a polymer-rich or polymer-only layer similar to the above-described outer gel coat 214 that provides a smooth inner finish in a desired color.

The illustrative composite sidewall 160R further includes one or more embedded anchors 400, 410 positioned between the core layer 200 and the adjacent skin layer 210, 220. The embedded anchors 400, 410 are described further in Section 5 below 3. Composite Molding Method The composite structures of the present disclosure, including the composite sidewall 160R of FIG. 2, may be formed by a layered molding process. An exemplary molding process involves (1) applying a gel-coat resin onto a mold surface to form the outer gel coat 214, (2) layering the reinforcing fibers of the outer FRP layer 212, the preforms of the core layer 200, the reinforcing fibers of the inner FRP layer 222, and any other desired layers (e.g., embedded anchors 400, 410 of Section 5 below) onto the outer gel coat 214, (3) wetting out the layers 212, 200, 222, and any other applied layers (e.g., embedded anchors 400, 410 of Section 5 below) with at least one laminating resin to impregnate and/or coat the fibers, (4) optionally applying another gel-coat resin onto the layers 212, 200, 222 to form the inner gel coat 224, and (5) curing the materials upon the mold surface (either sequentially and/or simultaneously) to form a single, integral, laminated composite sidewall 160R.

The laminating resin of step (3) may be a typical thermosetting resin, such as a vinyl ester, epoxy resin, or unsaturated polyester resin, although thermoplastic resins are also contemplated. The gel-coat resin of steps (1) and (4) may be a typical polyester gel-coat resin or a co-cure resin containing one or more elastomer components, such as urethane, co-cured with one or more laminating resin components, such as a vinyl ester, epoxy resin, or unsaturated polyester components. Exemplary co-cure resins are disclosed in U.S. Pat. No. 9,371,468 and U.S. Publication No. 2016/0263873, the disclosures of which are hereby incorporated by reference in their entireties.

Additional information regarding the construction of composite structures is disclosed in the following patents, each of which is incorporated by reference in its entirety herein: U.S. Pat. Nos. 5,429,066, 5,664,518, 5,800,749, 5,830,308, 5,897,818, 5,908,591, 6,004,492, 6,013,213, 6,206,669, 6,496,190, 6,497,190, 6,543,469, 6,723,273, 6,755,998, 6,869,561, 6,911,252, 8,474,871, 10,239,265.

4. Sidewall Accessories

Figure 3:
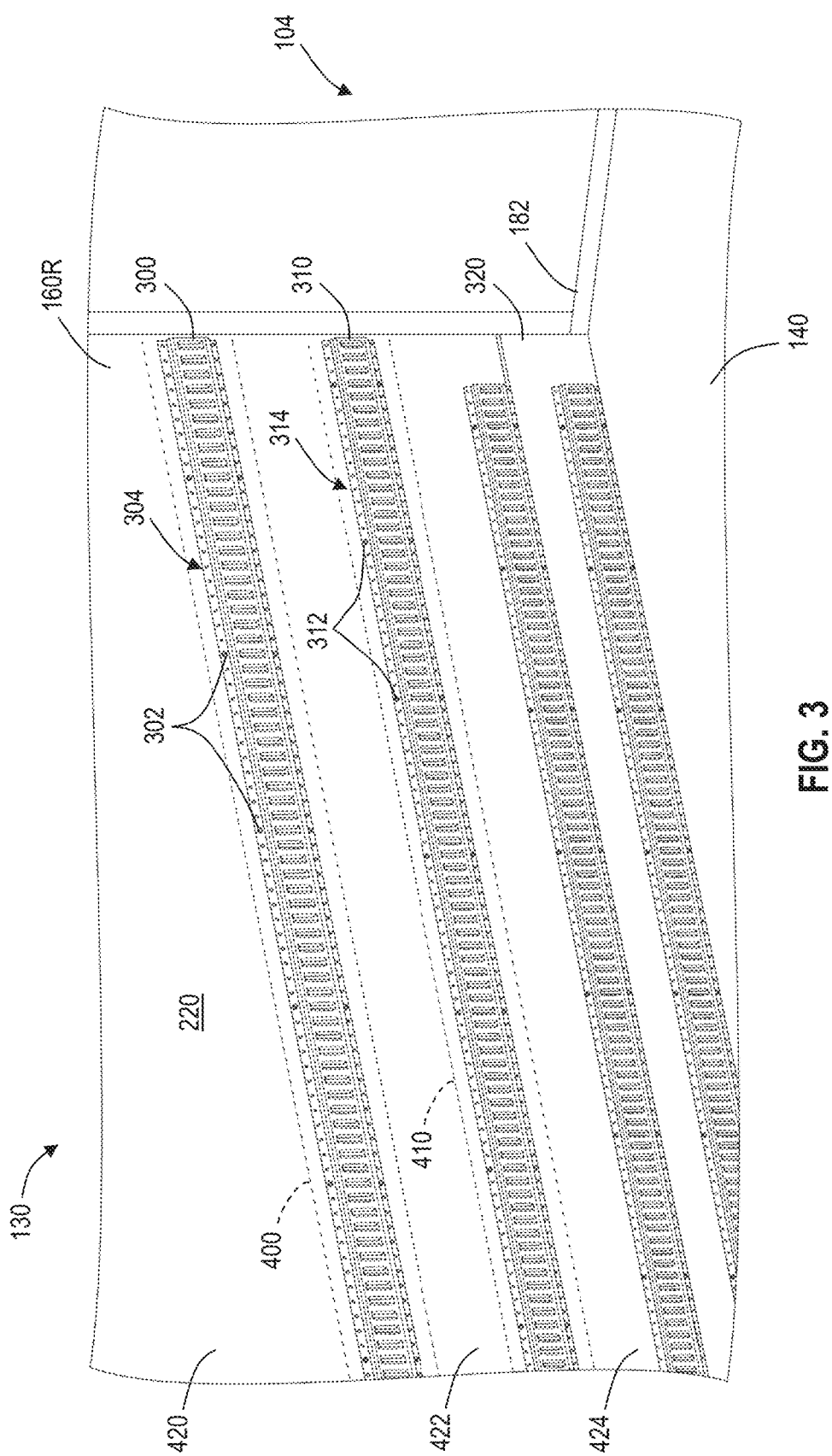
FIG. 3 is a perspective view inside the cargo body of FIG. 1, which shows interior accessories fastened to the embedded anchors of the right sidewall.

Referring next to FIG. 3, the interior cargo area of the cargo body 130 is shown, including the inner skin layer 220 of the right sidewall 1 60R. The illustrative sidewall 1 60R includes one or more interior accessories 300, 310 positioned against the inner skin layer 220 and fastened thereto using corresponding mechanical fasteners 302, 312. Each illustrative accessory 300, 310 includes a large number of holes 304, 314 such that fasteners 302, 312 may be placed in desired locations. The fasteners 302, 312 may be selected to resist withdrawal from the sidewall 160R, such as by modifying the fastener type (e.g., rivet, sheet metal screw, wood screw), size, pitch, and location. The interior accessories 300, 310 may also be adhered to the inner skin layer 220 of the sidewall 1 60R to enhance the mechanical connection.

In the illustrated embodiment of FIG. 3, the first interior accessory 300 is an upper horizontal logistic track (e.g., "E-track") fastened to the inner skin layer 220, and the second interior accessory 310 is a lower horizontal logistic track also fastened to the inner skin layer 220. Other suitable interior accessories include scuff plates 320, lights (not shown), and shelves (not shown), for example.

The sidewall 1 60R may also include exterior accessories coupled to the outer skin layer 210 (FIG. 2) with mechanical fasteners and/or adhesives. Suitable exterior accessories include exterior lights (not shown), for example.

5. Embedded Anchors

Referring again to FIGS. 2 and 3, the composite sidewall 160R includes the first embedded anchor 400 and the second embedded anchor 410. The first embedded anchor 400 is positioned beneath the first accessory 300 to receive the corresponding fasteners 302 through the holes 304 of the first accessory 300, through the inner skin layer 220, and into the first embedded anchor 400. Similarly, the second embedded anchor 410 is positioned beneath the second accessory 310 to receive the corresponding fasteners 312 through the holes 314 of the second accessory 310, through the inner skin layer 220, and into the second embedded anchor 410. The embedded anchors 400, 410 may locally strengthen the composite sidewall 1 60R and resist withdrawal of the corresponding fasteners 302, 312, similar to a wood stud behind drywall.

The embedded anchors 400, 410 are selectively positioned to receive the fasteners 302, 312 of the corresponding accessories 300, 310. Stated another way, the embedded anchors 400, 410 are selectively positioned in alignment with one or more holes 304, 314 of the corresponding accessories 300, 310. As shown in FIG. 3, the embedded anchors 400, 410 span continuously along substantially the entire length of the corresponding accessories 300, 310 and the composite sidewall 160R to receive fasteners 302, 312 in any of the holes 304, 314. However, it is also within the scope of the present disclosure to position discrete anchors beneath select holes 304, 314.

The areas of the composite sidewall 160R that do not receive fasteners 302, 312 need not be further strengthened. As shown in FIGS. 2 and 3, the embedded anchors 400, 410 span only a partial height of the composite sidewall 160R, leaving anchor-free areas 420, 422, 424 above, between, and below the anchors 400, 410, respectively. The ability to selectively position the anchors 400, 410 may improve the anchoring of fasteners 302, 312 where necessary while also minimizing the weight and thickness of the composite sidewall 1 60R.

As shown in FIG. 2, the embedded anchors 400, 410 may be positioned between the preforms of the core layer 200 and the desired skin layer 210, 220. Thus, the embedded anchors 400, 410 may be placed in their desired locations during the layering step (2) of Section 3 above. In this way, the molding method may be customized to accommodate the needs of the particular sidewall 160R and its particular accessories 300, 310. Also, this custom molding method may be performed without having to manufacture or obtain custom preforms, for example.

Figure 4:
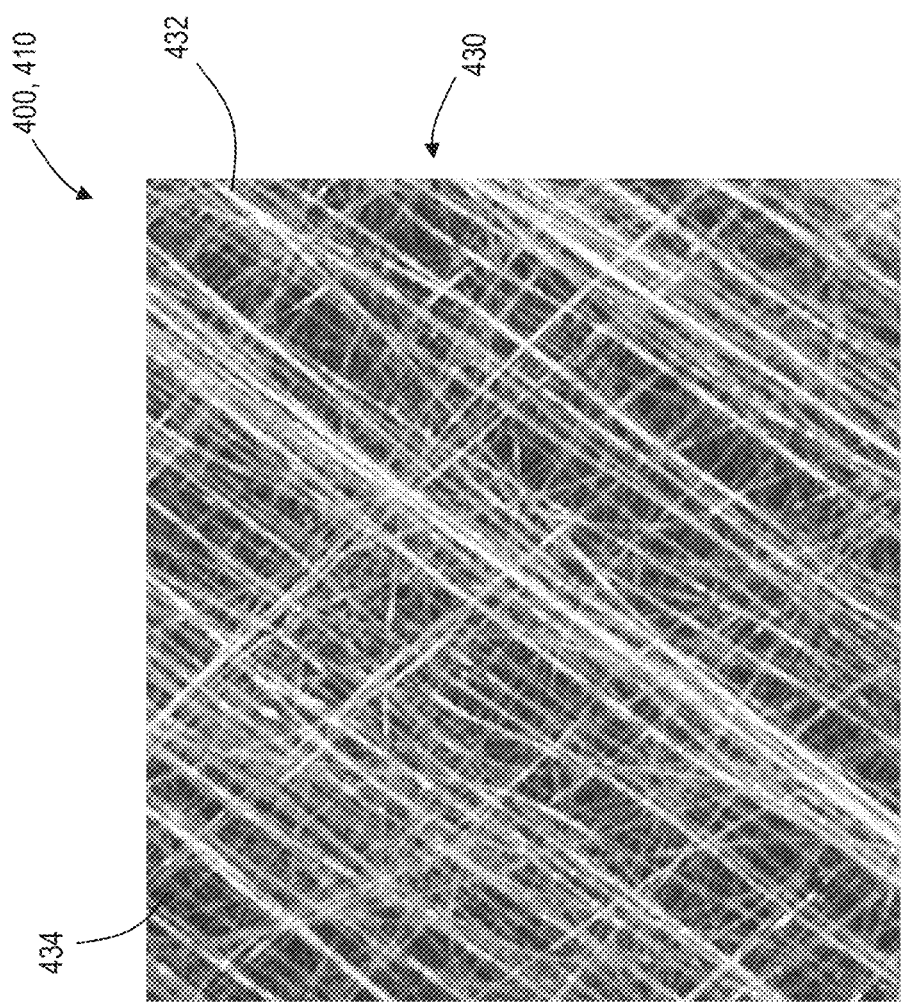
FIG. 4 is a microscopic image of a fabric veil for the embedded anchors.

According to an exemplary embodiment of the present disclosure, and as shown in FIG. 4, each embedded anchor 400, 410 includes a veil 430 of fibers 432 integrated into the surrounding polymer matrix. The veil 430 may be a non-woven fabric with continuous or chopped fibers 432. The fibers 432 may be bonded together thermally (e.g., calendered), mechanically (e.g., needle punched, spunbond), and/or chemically. The fibers 432 may be thermoplastic monofilaments, such as polyester (e.g., polyethylene terephtalate (PET)), polyethylene, polystyrene, or polypropylene monofilaments, or combinations thereof including bi-filaments, for example. Other suitable fibers 432 include aramid, nylon, acrylonitrile butadiene styrene (ABS), for example. In certain embodiments, the veil 430 may include a polyester-based spunbound or needle-punched fabric available from Oxco, Inc. of Charlotte, N.C. (e.g., Product No. Al 19N14WT1Cl), a polyester-based Trevira fabric available from Trevira GmbH in Bobingen, Germany, a polyester-based spunbound Evalith® fabric available from Johns Manville of Denver, Colo., a polyethylene-based Spectra® fabric available from Honeywell International Inc. of Morris Plains, N.J., or a polyester-based Avelle® fabric available from Xamax Industries, Inc. of Seymour, Conn., for example.

As shown in FIG. 4, the veil 430 is a porous material having an open, non-bunched arrangement of fibers 432 with pores 434 therebetween that accept a high weight ratio of resin to fibers 432. In some instances, the weight ratio of resin to fibers 432 may be about 5:1, about 7:1, about 10:1, or more. Typically, such veils are used at or near a structure's surface to form a smooth, polymer-rich surface finish that conceals and attaches to the underlying reinforcing layers. However, in this case, the veil 430 may form polymer-rich embedded anchors 400, 410. The veil 430 may be more porous than typical reinforcing fiber layers (e.g., FRP layers 206, 212, 222 of FIG. 2), where the weight ratio of resin to fibers 432 may be about 1:1, about 1:2, or more. The veil 430 may be pre-impregnated or impregnated with a different resin or a different co-cure strain tuning level compared to the resin of the adjacent FRP layers 206, 212, 222 (See Section 3 above) to optimize the performance and damage resistance of the veil 430. In one example, the veil 430 may be pre-impregnated or impregnated during lamination with a thermoplastic resin different from the thermoset resin of the adjacent FRP layers 206, 212, 222. In another example, the veil 430 may be pre-impregnated or impregnated during lamination with a resin having a higher co-cure level than the resin of the adjacent FRP layers 206, 212, 222 to improve fastener toughness and crack resistance.

The fibers 432 of the veil 430 may be more flexible than those of typical reinforcing layers (e.g., FRP layers 206, 212, 222 of FIG. 2). Typical reinforcing fibers may be rigid, structural fibers like glass configured to strengthen the surrounding polymer matrix. By contrast, the fibers 432 of the veil 430 may be flexible and considered non-reinforcing. Without wishing to be bound by theory, the flexible fibers 432 may have sufficient toughness to mitigate damage during installation of the fasteners 302, 312 and may deform and/or move to accommodate the fasteners 302, 312 (FIG. 3) while serving as crack arresters that help prevent the spread of cracks through the surrounding polymer matrix. The flexibility of the veil 430 may be measured in terms of tensile strength, elongation, and Young's Modulus, for example. In certain embodiments, the veil 430 may have a tensile strength before lamination of about 20 lbs to about 40 lbs, such as about 30 pounds, and may exhibit elongation before lamination of about 25% to about 200%, such as about 40% to about 100%. The veil 430 may have non-uniform flexibility, such that these values vary when measured in the machine direction (MD) and the cross direction (CD). In one example, the MD tensile strength may exceed the CD tensile strength, and the CD elongation may exceed the MD elongation. The tensile strength and elongation may be measured according to ASTM D4632.

The veil 430 may have a lower area density than typical reinforcing fiber layers (e.g., FRP layers 206, 212, 222 of FIG. 2). In certain embodiments, the veil 430 may have an area density of about 500 g/m$^2$ or less, such as about 10 g/m$^2$ to about 500 g/m$^2$, or about 30 g/m$^2$ to about 300 g/m$^2$, or about 30 g/m$^2$ to about 200 g/m$^2$, or about 50 g/m$^2$ to about 150 g/m$^2$, or about 110 g/m$^2$ to about 150 g/m$^2$. The area density may be measured according to ASTM D461.

The veil 430 may also be thinner than typical reinforcing fiber layers. In certain embodiments, the veil 430 may have a thickness of about 0.060 inches (60 mils) or less, such as about 0.005 inches (5 mils) to about 0.055 inches (55 mils), about 0.015 inches (15 mils) to about 0.045 inches (45 mils), or about 0.025 inches (25 mils) to about 0.035 inches (35 mils). Alternatively, the veil 430 may be the same thickness or thicker than typical reinforcing fiber layers. In these embodiments, the veil 430 may have a thickness of about 0.10 inches (100 mils) or more, such as about 0.10 inches (100 mils) to about 0.30 inches (300 mils), or about 0.15 inches (150 mils) to about 0.25 inches (250 mils), or about 0.20 inches (200 mils). The thickness of the veil 430 may be increased by using multiple layers of material, with each layer optionally pre-impregnated or impregnated with a different resin or a different co-cure strain tuning level compared to other layers of the veil 430. The thickness may be measured according to ASTM D5729.

The embedded anchors 400, 410 may be modified to accommodate various fasteners and their corresponding attachments. More specifically, the properties of the veil 430, the properties of the incorporated resin, the number, the size, the shape, and the location of the embedded anchors 400, 410 may be modified to accommodate various fasteners and their corresponding attachments to the floor 140 (e.g., suspension, landing gear, fuel tank), roof 150, left sidewall 1 60L (e.g., scuff plates 320, lights, shelves, other accessories), and/or front wall 170 (e.g., thermal control unit) of the composite cargo body 130. For example, as the fasteners 302, 312 increase in size, the veils 430 of the corresponding embedded anchors 400, 410 may also increase in thickness to support heavier loads from the attachments. In certain embodiments, the attachment may be an adjacent composite panel of the composite cargo body 130, such that embedded anchors 400, 410 may be placed continuously or discretely along joints between the floor 140, roof 150, sidewalls 160R, 160L, and/or front wall 170 to receive fasteners for assembling the adjacent panels.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed is:

1. A laminated composite structure of a cargo body, the composite structure comprising:
   a core layer including an inner foam core surrounded by a first fiber-reinforced polymer;

an outer skin layer coupled to the core layer and including a second fiber-reinforced polymer;

an inner skin layer coupled to the core layer and including a third fiber-reinforced polymer; and at least one anchor embedded between the first fiber-reinforced polymer and an adjacent one of the second and third fiber-reinforced polymers, wherein the at least one anchor includes a porous veil of nonwoven fibers.

2. The composite structure of claim 1, further comprising an accessory coupled to the outer or inner skin layer with a mechanical fastener, wherein the mechanical fastener extends through the outer or inner skin layer and into the at least one anchor.

3. The composite structure of claim 1, wherein the at least one anchor spans a partial area of the composite structure, whereby the composite structure further comprises at least one anchor-free area outside of the partial area.

4. The composite structure of claim 1, wherein the fibers of the veil are thermoplastic.

5. The composite structure of claim 1, wherein the fibers of the veil are polyester, polyethylene, polystyrene, or polypropylene monofilaments or combinations thereof as bi-filaments.

6. The composite structure of claim 1, wherein the fibers of the veil are spunbond or needle punched.

7. The composite structure of claim 1, wherein the at least one anchor has a higher resin to fiber weight ratio than the first, second, and third fiber-reinforced polymers.

8. The composite structure of claim 7, wherein the resin to fiber weight ratio of the at least one anchor is about 5:1 or more.

9. The composite structure of claim 1, wherein the fibers of the veil are more flexible than the fibers of the first, second, and third fiber-reinforced polymers.

10. The composite structure of claim 1, wherein the veil has a lower area density than the first, second, and third fiber-reinforced polymers.

11. The composite structure of claim 10, wherein the area density of the veil is about 500 g/m$^2$ or less.

12. The composite structure of claim 1, wherein the veil is thinner than each of the first, second, and third fiber-reinforced polymers.

13. The composite structure of claim 12, wherein the thickness of the veil is about 0.055 inches or less.

14. The composite structure of claim 12, wherein the thickness of the veil is about 0.10 inches or more.

15. The composite structure of claim 1, wherein:
the composite structure is a sidewall of the cargo body;
the core layer includes a plurality of preforms, each preform including the inner foam core surrounded by the first fiber-reinforced polymer;
the outer skin layer further includes an outer gel-coat covering the second fiber-reinforced polymer;
the inner skin layer further includes an inner gel-coat covering the third fiber-reinforced polymer.

16. A method of manufacturing a composite structure of a cargo body as claimed in claim 1, the method comprising the steps of:
applying a gel-coat resin onto a mold surface to form a first gel coat;
applying a first reinforcing fiber layer onto the first gel coat;
arranging a core layer including a plurality of preforms on the first reinforcing fiber layer;
applying at least one porous veil of nonwoven fibers adjacent to the preforms;
applying a second reinforcing fiber layer onto the preforms;
applying a laminating resin to wet-out the first reinforcing fiber layer, the second
reinforcing fiber layer, and the veil; and
curing the gel-coat and laminating resins.

17. The method of claim 16, further comprising coupling an accessory to the composite structure by anchoring a mechanical fastener into the veil.

18. The method of claim 16, wherein the veil soaks up more of the laminating resin per area than each of the first and second reinforcing fiber layers.

19. The method of claim 16, wherein the veil covers only a portion of the core layer.

20. A laminated composite structure of a cargo body, the composite structure comprising:
a core layer;
an outer skin layer coupled to the core layer;
an inner skin layer coupled to the core layer;
an accessory coupled to the outer or inner skin layer with a mechanical fastener; and
at least one anchor completely embedded between the core layer and the outer or inner skin layer and receiving the mechanical fastener.

21. The composite structure of claim 20, wherein the accessory is a logistics track having a length, the at least one anchor spanning the length of the accessory.

22. The composite structure of claim 20, further comprising:
a second accessory coupled to the outer or inner skin layer with a second mechanical fastener;
at least one second anchor embedded between the core layer and the outer or inner skin layer and receiving the second mechanical fastener; and
an anchor-free area between the first and second anchors.

* * * * *